US 8,667,563 B1

(12) United States Patent
Sandoval (10) Patent No.: US 8,667,563 B1
(45) Date of Patent: Mar. 4, 2014

(54) SYSTEMS AND METHODS FOR DISPLAYING PERSONALIZED CONTENT (75) Inventor: Christopher Andrew Sandoval, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 942 days.

(21) Appl. No.: 11/867,971

(22) Filed: Oct. 5, 2007

(51) Int. Cl.
*G06F 21/00* (2013.01)

(52) U.S. Cl.
USPC ........... 726/3; 713/202; 726/2; 726/4; 726/26

(58) Field of Classification Search
None
See application file for complete search history.

(56) References Cited

U.S. PATENT DOCUMENTS

| | | | |
|---|---|---|---|
| 5,966,705 A | 10/1999 | Koneru et al. | |
| 6,308,273 B1 * | 10/2001 | Goertzel et al. | 726/9 |
| 6,725,265 B1 * | 4/2004 | Challenger et al. | 709/226 |
| 6,796,492 B1 * | 9/2004 | Gatto | 135/379 |
| 6,871,213 B1 | 3/2005 | Graham et al. | |
| 6,986,047 B2 | 1/2006 | Giles et al. | |
| 7,100,204 B1 * | 8/2006 | Myllymaki et al. | 726/22 |
| 7,370,347 B2 * | 5/2008 | Ullrich | 726/4 |
| 7,673,793 B2 | 3/2010 | Greene et al. | |
| 2001/0037469 A1 * | 11/2001 | Gupta et al. | 713/202 |
| 2002/0152034 A1 * | 10/2002 | Kondo et al. | 702/19 |
| 2002/0165810 A1 | 11/2002 | Evertsz et al. | |
| 2004/0037284 A1 * | 2/2004 | Bergek et al. | 370/392 |
| 2005/0044176 A1 | 2/2005 | Sears et al. | |
| 2005/0144073 A1 | 6/2005 | Morrisroe et al. | |
| 2005/0177750 A1 | 8/2005 | Gasparini et al. | |
| 2005/0278617 A1 | 12/2005 | Martell et al. | |
| 2006/0190990 A1 | 8/2006 | Gruper et al. | |
| 2007/0056022 A1 * | 3/2007 | Dvir | 726/4 |
| 2007/0174905 A1 | 7/2007 | Martherus et al. | |
| 2008/0004986 A1 | 1/2008 | Choe | |
| 2008/0021983 A1 | 1/2008 | Dodson | |
| 2008/0306829 A1 | 12/2008 | Moore et al. | |

FOREIGN PATENT DOCUMENTS

TW 200422867 11/2004

OTHER PUBLICATIONS

John Schwartz; "Giving Web a Memory Cost Its Users Privacy"; New York Times; Sep. 4, 2001; pp. 1-6; Copyright 2007 The New York Times Company.
"Persistent client state—HTTP cookies—Preliminary specification"; pp. 1-5; http://wp.netscape.com/newsref/std/cookie_spec.html; Copyright 1999 Netscape.

(Continued)

*Primary Examiner* — Edan Orgad
*Assistant Examiner* — Brian Olion
(74) *Attorney, Agent, or Firm* — Brooks, Cameron & Huebsch, PLLC (57) ABSTRACT

When a user successfully authenticates into a website associated with an institution system, a cookie may be created and set on the web browser, and cookie information and additional information such as the associated internet protocol (IP) address or network interface card (NIC) identifier may be stored at the institution system. Later, when the user accesses the website again, the website may use the cookie, the cookie information, and additional information such as the stored IP address or NIC identifier to identify the user. After the user is identified, one or more pages of content may be personalized to the user, and provided to the user via the user's computing device.

15 Claims, 6 Drawing Sheets (56) References Cited

OTHER PUBLICATIONS

Whalen, David; "The Unofficial Cookie FAQ"; Jun. 8, 2002; pp. 1-13; Version 2.6; http://www.cookiecentral.com/faq/; Cookie Central.

"Cookie Property"; msdn; pp. 1-3; http://msdn2.microsoft.com/en-us/library/ms533693(d=printer).aspx; Copyright 2007 Microsoft Corporation.

Boutell, Thomas; "WWW FAQs: How do I pass data between JavaScript pages?"; Feb. 9, 2007; pp. 1-6; http://www.boutell.com/newfaq/creating/scriptpass.html; Copyright 2006 Boutell.Com, Inc.

\* cited by examiner

SYSTEMS AND METHODS FOR DISPLAYING PERSONALIZED CONTENT

CROSS-REFERENCE TO RELATED APPLICATIONS

This application is related by subject matter to that disclosed in the following commonly assigned applications, the entirety of which are hereby incorporated by reference herein: U.S. patent application Ser. No. 11/867,934, and U.S. patent application Ser. No. 11/867,962, each filed on Oct. 5, 2007 and each entitled "Systems And Methods For Displaying Personalized Content."

BACKGROUND

The Internet is a mostly anonymous channel. Hypertext transfer protocol (HTTP) cookies, referred to herein as cookies, are small text files on a user's computer which may be used by web servers to differentiate users and to maintain data related to the user during navigation, possibly across multiple visits.

A cookie may be used to identify a user of an individual website without the user logging on to the website with their credentials or otherwise authenticating their identity. However, cookies are not secure, may be stolen, and do not always accurately identify users. Therefore, a website may not offer personalized information to a user based on the cookie on the user's computer, because of the risk that the user identified by the cookie is not the user who is actually visiting the website.

SUMMARY

In an implementation, when a user successfully authenticates into a website associated with an institution system, a cookie may be created and set on the web browser, and cookie information and additional information such as the associated internet protocol (IP) address or network interface card (NIC) identifier may be stored at the institution system. Later, when the user accesses the website again, the website may use the cookie, the cookie information, and additional information such as the stored IP address or NIC identifier to identify the user. After the user is identified, one or more pages of content may be personalized to the user, and provided to the user via the user's computing device.

In another implementation, a user may be identified with a certain level of confidence, depending on various factors, such as the strength of the match of the IP address of the user computing device that is being used to access the website and the IP address, or one of the IP addresses, that is stored as additional information. With certain types of content that are to be personalized and delivered to a user, the institution may determine that an exact match of the IP addresses may not have to occur.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
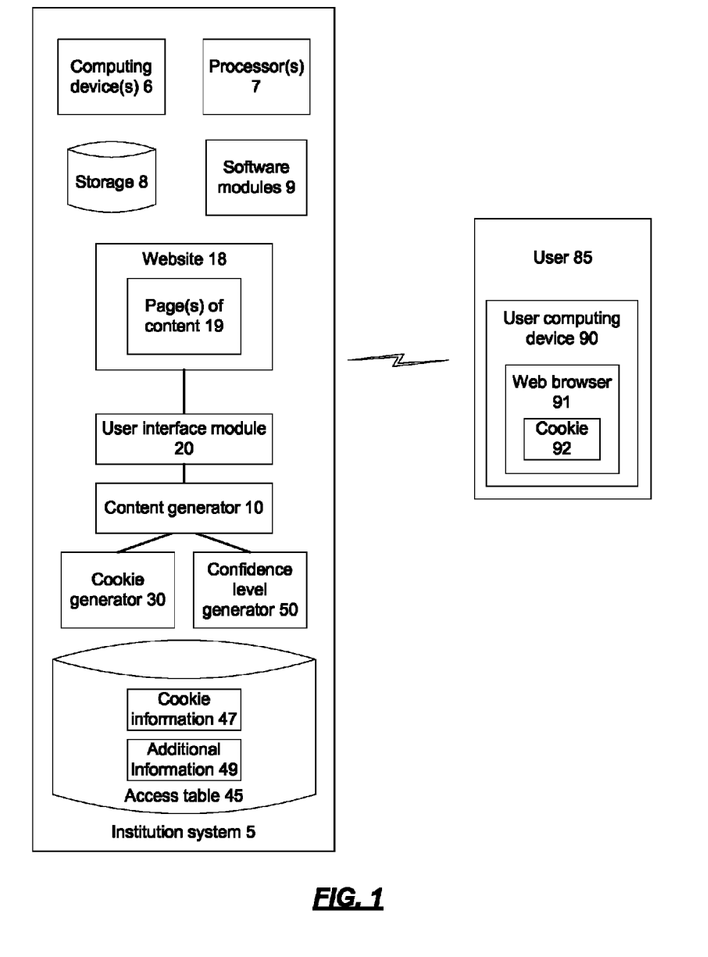
FIG. 1 is a block diagram of an implementation of a system that may be used to display personalized content.

FIG. 1 is a block diagram of an implementation of a system that may be used to display personalized content. An institution system 5, associated with or otherwise maintained by an institution such as a financial services institution, may include a content generator 10 and a user interface module 20. The content generator 10 may generate data to be provided as content to a user 85 via a user computing device 90. An example user computing device 90 is described with respect to FIG. 6.

In an implementation, the user interface module 20 may receive content from the content generator 10 and format one or more pages of content 19 as a unified graphical presentation that may be provided to the user computing device 90. The page(s) of content 19 may be provided to the user computing device 90 via a website 18 associated with the institution system 5. When the user 85 accesses the website 18, they may be presented with information pertaining to the institution or products and services of the institution, for example, via the page(s) of content 19. A web browser 91 may be used for connection between the user computing device 90 and the website 18. As described further herein, the content that may be delivered to the user computing device 90 may be personalized to the user 85.

The institution system 5 may include a cookie generator 30 in an implementation that generates a cookie 92. As is known, a cookie is a parcel of text chosen and sent by a web server to a web browser and may be sent back unchanged by the web browser each time it accesses that server. Any known techniques may be used to generate and set a cookie. Here, the cookie 92 may be considered reliable because it is set after the user has properly and fully authenticated to the institution system 5 via the website 18. The cookie 92 may be a unique value that corresponds to the user 85 who authenticated themselves to the website 18. The cookie 92 may be persistent, as it may not expire and may live beyond when the web browser 91 is closed.

In an implementation, the cookie 92 may be stored on the web browser 91 of the user computing device 90. Corresponding information pertaining to the cookie 92, referred to herein as cookie information 47, may be stored on the institution system 5 in an access table 45 or other storage, for example. The cookie information 47 may include data based on the cookie 92 as well as information pertaining to the user 85 who has been authenticated.

The cookie 92 and the cookie information 47 may be used in conjunction with additional information 49 stored in the access table 45 or other storage to identify the user 85. After the cookie 92 is stored on the web browser 91, and the cookie information 47 and the additional information 49 are set and stored in the access table 45, the user 85 may be identified when they subsequently access the website 18 without authenticating themselves to the website by logging in. Although the implementations described herein may refer to storing the cookie information 47 and the additional information 49 in the access table 45, this is not intended to be limiting, as the cookie information 47 and the additional information 49 may be stored in any storage associated with the institution system 5.

The additional information 49 may be data that may be used in identification of the user 85 or the user computing device 90, such as the IP address of the user computing device 90 or the NIC identifier of the user computing device 90. An IP address is a unique address that certain electronic devices use to identify and communicate with each other on a computer network utilizing the internet protocol standard—in simpler terms, a computer address. A NIC is a piece of computer hardware designed to allow computers to communicate over a computer network. Every NIC has a unique 48-bit serial number identifier that is stored in memory carried on the card. The additional information 49 may be collected and stored in the access table 45 at the time the user 85 initially authenticates to the website 18.

More particularly, in an implementation, when a user 85 successfully authenticates into a website 18, using any known authentication technique, a cookie 92 may be created and set on the web browser 91, and cookie information 47 and additional information 49 such as the associated IP address or NIC identifier may be stored at the institution system 5. Later, when the user 85 accesses the website 18 again, the website 18 may use the cookie 92, the cookie information 47, and additional information 49 such as the stored IP address or NIC identifier to identify the user 85. After the user 85 has been identified, one or more pages of content 19 may be personalized to the user 85 with a level of confidence, and provided to the user 85 via the user computing device 90.

Personalization may include presentation of the page(s) of content 19 and/or functionality of the page(s) of content 19. For example, if the website is directed to loans or other financial services, personalization may be directed to an auto loan, and may provide general information on auto loans, specific information on particular auto loans, or information about a pre-approved auto loan directed to the user. It is contemplated that some of the personalized content that is displayed may be selectable by a user, for example, by clicking on the displayed content or entering information into a data entry box associated with the displayed content. In some implementations, if the user selects such personalized content, they may have to authenticate to the website or otherwise log in or provide their credentials to the website. Personalization is not limited to auto loans and may be directed to any type of data, information, product, service, advertisement, etc.

As noted above, the institution system 5 may include storage such as an access table 45 that comprises the cookie information 47 and the additional information 49. In an implementation, the additional information 49 may comprise one or more IP addresses that the user computing device 90 has previously used to access the website 18. The additional information 49 may have a limit, such as a time limit, as to how long it will retain a previously used IP address. Additionally or alternatively, a quantity limit may be used that is directed to the number of previous IP addresses that may be stored in the additional information 49.

In an implementation, the user 85 may be identified with a certain level of confidence, depending on various factors, such as the strength of the match of the IP address of the user computing device 90 that is being used to access the website 18 and the IP address, or one of the IP addresses, that is stored as additional information 49. With certain types of content that is to be personalized and delivered to a user, the institution may determine that an exact match of the IP addresses may not have to occur. This may be implemented given that IP addresses are commonly dynamic, although typically dynamic within a given range of IP addresses.

A confidence level generator 50 may used to determine a confidence level of an identification of the user 85, based on the match of the IP address, in an implementation. Depending on an IP address match, there may be varying levels of certainty about the user's identity.

As is known, IP addresses may be 32 bits wide (in the IP version 4 standard) or 128 bits wide (in the IP version 6 standard), for example, and may be assigned to computers on a network. Often, IP addresses are assigned by a remote server that is acting as a dynamic host configuration protocol (DHCP) server. IP addresses assigned using DHCP may change depending on the addresses available in the set. Thus, the user computing device 90 may get an IP address in a range of addresses each time the user logs in to the network to access the website 18. The IP address used by the user computing device 90 may not be the same each time, but may be in the range of addresses.

For example, the IP address may always be in the range of 161.151.72.01 to 161.151.72.99. So in an implementation, an exact match of the IP address may result in a very high confidence level (e.g., 100%), whereas a close match (e.g., the first 8 numbers) may result in a high confidence level though not as high as an exact match (e.g., 90%). Based on the confidence level, varying levels of personalized information may be displayed. For example, for a very high confidence level, the user's name may be used and the user may be invited to participate in some personalized offer (e.g., "Hi Mr. Jones, you're pre-approved for an auto loan. Click here."). For a lower confidence level, however, the personalized content may be more general (e.g., "Hi, here is some information pertaining to auto loans"). And for a confidence level below a certain threshold, no content may be personalized, in an implementation.

Thus, an otherwise anonymous visit may be more personalized without compromising personal information about the user 85 and without adding measureable risk to the institution system 5. In an implementation, the page(s) of content 19 that may be personalized to the user 85 may be directed to personalized advertising.

The institution system 5 may comprise one or more computing devices 6. The user computing device 90 may allow the user 85 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user, the cookies, the IP addresses, the NIC identifiers, or any of the processing performed by the institution system 5, may be stored in storage 8 or other storage, for example.

Example software modules may include modules for receiving and processing information from the user computing device 90, storing cookies and additional information in storage 8 or the access table 45, retrieving cookies and other information from storage 8 or the access table 45, and comparing information received from the user computing device 90 with information in storage 8 or the access table 45, described further herein. While specific functionality is described herein as occurring with respect to specific modules, more, fewer, or other modules may likewise perform the functionality. The functionality may be distributed among more than one module. An example computing device and its components are described in more detail with respect to FIG. 6.

Figure 2:
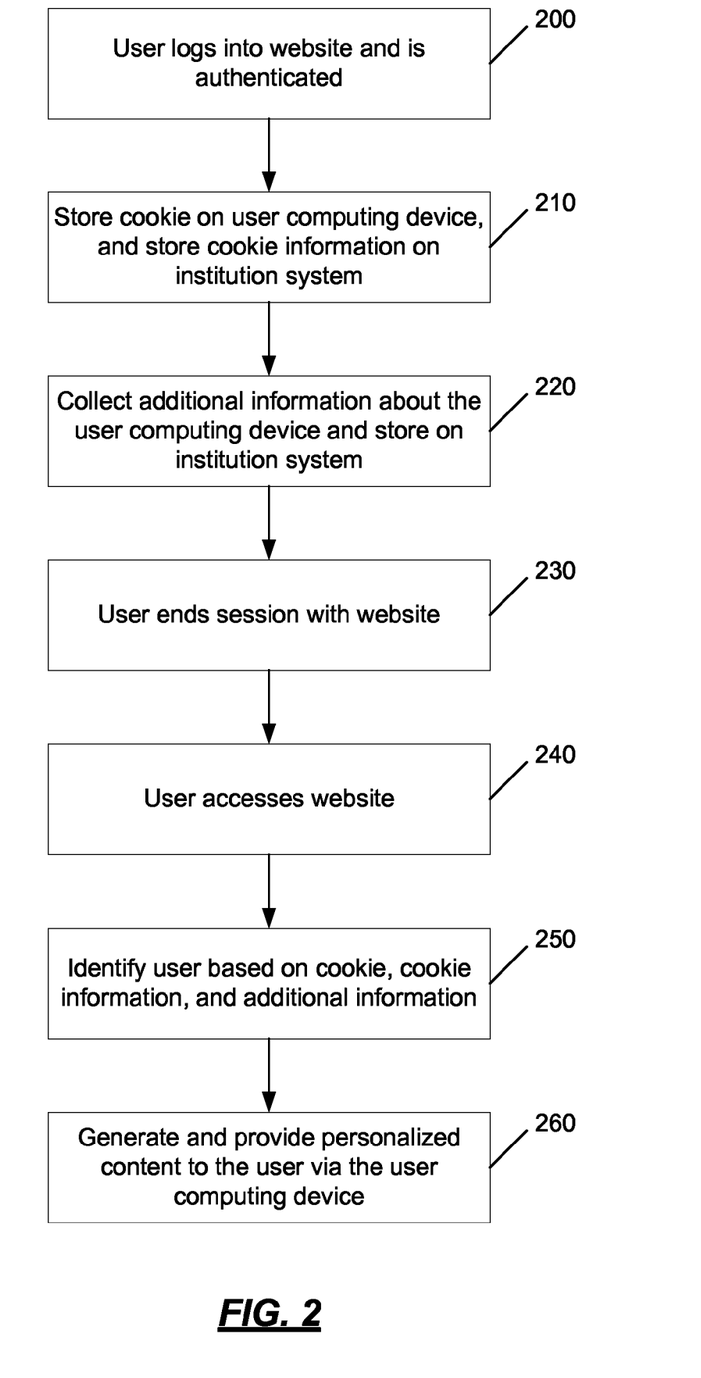
FIG. 2 is an operational flow of an implementation of a method of displaying personalized content.

FIG. 2 is an operational flow of an implementation of a method of displaying personalized content. At operation 200, a user may log into a website via a user computing device with a web browser and may be authenticated. In an implementation, the website may be associated with an institution system, such as a system maintained by a financial services institution. Any known technique of authentication may be used, such as user name, password, personal identification number (PIN), thumbprint, key, or other identifier or credential, or a combination thereof, for example.

At operation 210, a cookie may be stored on the user computing device, on the web browser for example, and cookie information, comprising information pertaining to the cookie and the authenticated user (e.g., name, address, age, gender, marital status, income, products previously purchased, etc.), may be stored on the institution system. Additional information about the user computing device may also be collected by the institution system and stored on the institution system, at operation 220. This additional information may be the IP address or the NIC identifier, for example. The user may end the session with the website, by closing the web browser, for example, at operation 230.

At some point in the future, at operation 240, the user may access the website again, but may not log on or otherwise authenticate. At operation 250, the cookie, the cookie information, and the additional information may be retrieved and checked to identify the user and access the previously stored user information. Personalized content may then be generated and delivered to the user via the user computing device, based on the user information and, in some implementations, a level of confidence in the identity of the user, at operation 260.

Figure 3:
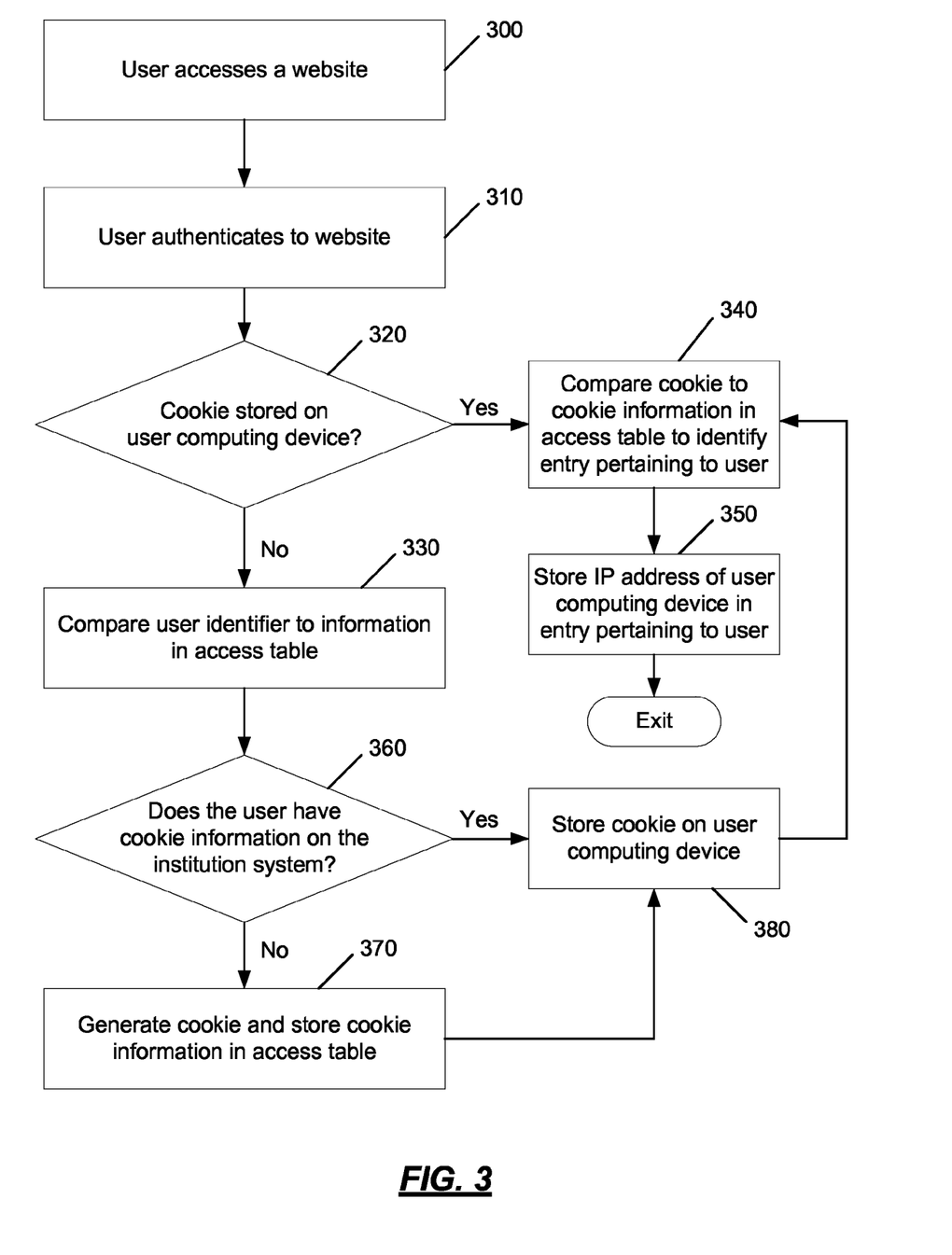
FIG. 3 is an operational flow of an implementation of a method of storing a cookie and additional information that may be used to identify a user.

FIG. 3 is an operational flow of an implementation of a method of storing a cookie and additional information that may be used to identify a user. At operation 300, a user may access a website associated with an institution system, for example, via a web browser associated with a user computing device, and may authenticate to the website at operation 310, using any known authentication technique.

At operation 320, it may be determined if a cookie is stored on the user computing device, such as on the web browser. If so, then the cookie may be compared to cookie information stored in an access table or other storage maintained by the institution system, at operation 340. This may identify an entry or other data in the access table that pertains to the user. In an implementation, the IP address of the user computing device that the user has used to access the website may be stored in the access table in an entry associated with the cookie information and thus the user, at operation 350.

If a cookie is not stored on the web browser, as determined at operation 320, then the user identifier, provided during authentication for example, may be compared to information in the access table, at operation 330. It may be determined at operation 360 whether there is cookie information stored in the access table that corresponds to the user. If so, the cookie, determined from the cookie information, is stored on the user computing device, at the web browser for example, at operation 380, and processing continues at operation 340. If the user does not have cookie information already stored in the access table as determined at operation 360, a cookie may be generated, and cookie information may be stored in the access table at operation 370. The cookie information may pertain to the cookie and the user. Processing continues at operation 380.

Figure 4:
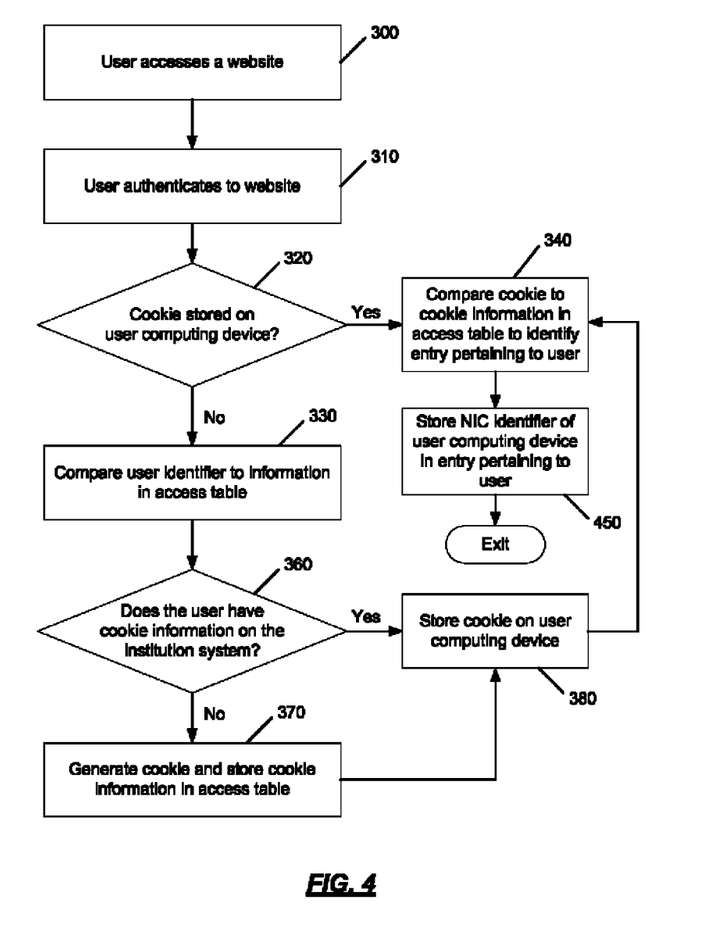
FIG. 4 is an operational flow of another implementation of a method of storing a cookie and additional information that may be used to identify a user.

FIG. 4 is an operational flow of another implementation of a method of storing a cookie and additional information that may be used to identify a user. The implementation shown in FIG. 4 is similar to that shown FIG. 3 and may have operations that are similar. These similar operations are labeled identically and their descriptions are omitted for brevity.

In FIG. 4, instead of using the IP address as additional information to store with the cookie information in the access table, the NIC identifier may be used. Thus, after operation 340 in which the cookie may be matched to cookie information stored in the access table, the NIC identifier of the user computing device may be stored in the access table in an entry associated with the cookie information, at operation 450.

Figure 5:
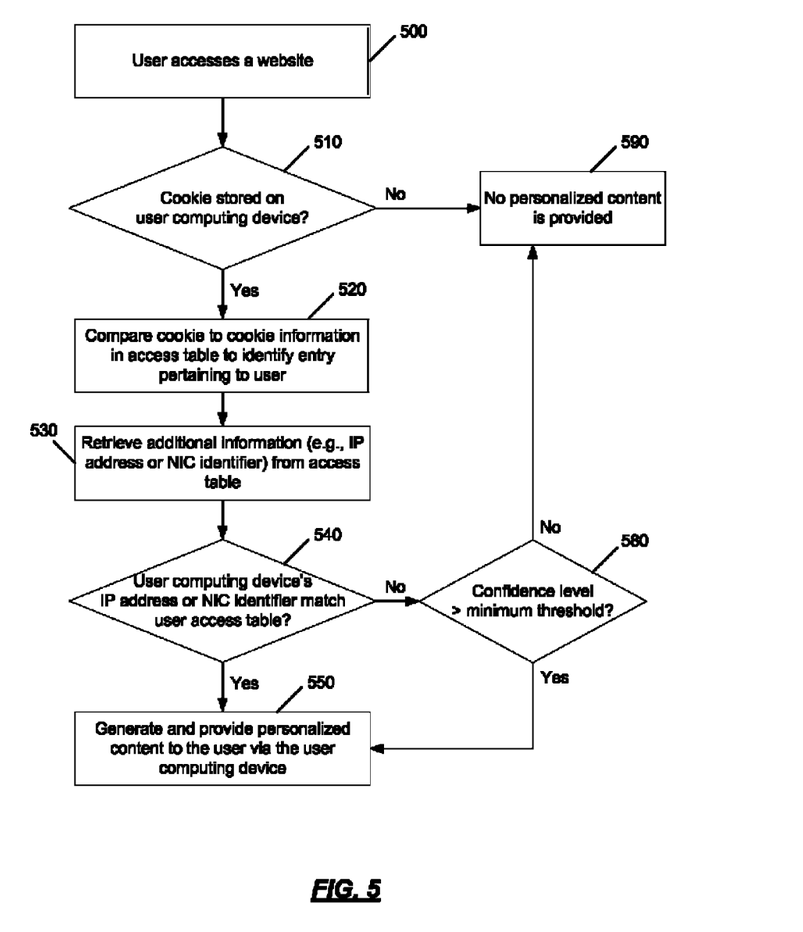
FIG. 5 is an operational flow of an implementation of a method using a cookie and additional information to display personalized content.

FIG. 5 is an operational flow of an implementation of a method using a cookie and additional information to display personalized content. At operation 500, a user may access a website associated with an institution system, for example, via a web browser associated with a user computing device. At operation 510, it may be determined if a cookie is stored on the user computing device, such as on the web browser. If not, then the user may not be identified with a predetermined minimum level of confidence, so no personalized content may be generated or provided to the user, at operation 590. Content may be provided to the user via the web browser and user computing device without any personalization.

If a cookie is stored on the web browser, as determined at operation 510, the cookie may be compared to cookie information stored in an access table or other storage maintained by the institution system, at operation 520, in an implementation. This may identify an entry or other data in the access table that pertains to the user.

In an implementation, the additional information, such as the IP address (or multiple IP addresses) or NIC identifier that had been previously stored, may be retrieved from the access table from the entry corresponding to the cookie, at operation 530. The retrieved additional information may be compared to the additional information (e.g., the IP address, the NIC identifier) on the user's computing device, at operation 540. If there is a match, in an implementation, personalized content in accordance with the level of confidence may be generated and provided to the user via the user computing device via the website, at operation 550.

However, if there is no match, then at operation 580 it may be determined if there is a close enough match between the additional information that was retrieved and the additional information on the user's computing device, such that a confidence level of the identity of the user based on the strength of the match is greater than a predetermined minimum threshold. If the match is close enough such that the confidence level is above the predetermined minimum threshold pertaining to the level of confidence in the identity of the user, then personalized content may be generated and provided as in operation 550. If there is no match that is close enough, the confidence level may be less than the minimum threshold, and no personalized content may be generated or provided to the user, at operation 590.

Confidence level may be related to how many of the leading numbers of the IP addresses match. In an implementation, the minimum threshold for a match to be considered high enough for personalization may be the first six numbers of the IP addresses. So if at least the first six numbers of the IP addresses match, then the confidence level may be considered high enough to personalize the content. This implementation is not intended to be limiting, and the minimum threshold may be based on other factors or other amounts of IP address match.

The amount of personalization may be based on how close the IP addresses match, in an implementation. If the IP addresses exactly match, then the content may be highly personalized. However, for example, if only the first six numbers of the IP addresses match, then the content may be personalized, but may be less specifically personalized to the user than if the IP addresses exactly match. Additionally, for example, if only the first six numbers of the IP addresses match, then the content may be personalized less than if more than the first six numbers of the IP addresses match though the all the numbers of the IP addresses do not exactly match.

Exemplary Computing Arrangement

Figure 6:
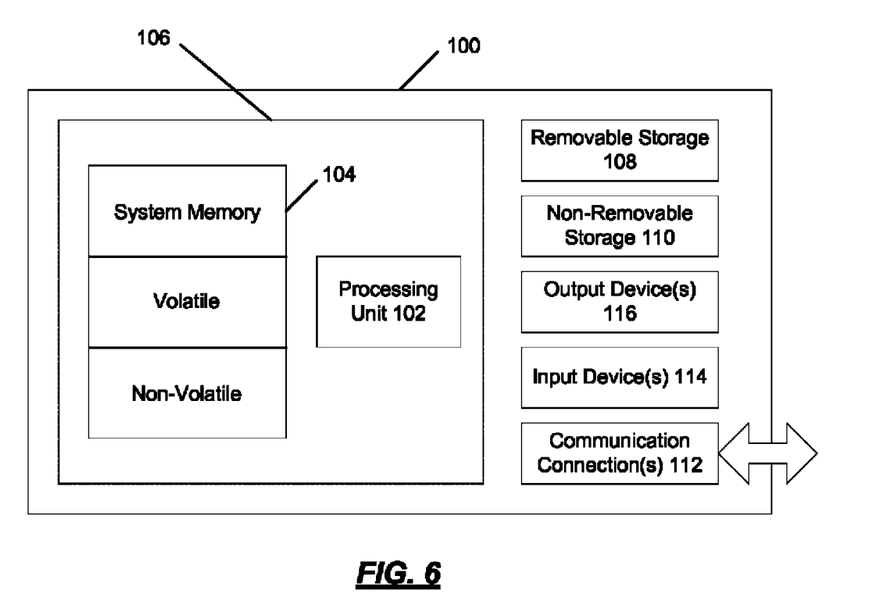
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 6 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing personalized content to a user of a website via a user computing device, comprising:
    authenticating a user to a website;
    storing, in response to the authentication, a cookie on a web browser, cookie information on an institution system associated with the website, and additional information on the institution system associated with the website;
    identifying an identity of the user based on a cookie stored on the user computing device, cookie information stored on an institution system associated with the website, and additional information associated with the user computing device stored on the institution system;
    determining a particular confidence level associated with the identification of the identity of the user from a range of confidence levels representing a strength of an internet protocol (IP) address match of the user computing device, wherein the range includes more than two confidence levels;
    generating a particular degree of personalized content personalized to the user, including personalized content the user is permitted to select, wherein the personalized content is based on the particular confidence level associated with the identification of the identity of the user; and
    delivering the personalized content to the user computing device.

2. The method of claim 1, wherein the personalized content is based on the additional information associated with the user computing device stored on the institution system.

3. The method of claim 1, further comprising:
    logging the user into the website during a session and authenticating the user prior to storing the cookie directed to the website on the user computing device; and
    ending the session and then providing access to the website to the user.

4. The method of claim 1, wherein the cookie information comprises information pertaining to the cookie and information pertaining to the user, and the additional information comprises an internet protocol (IP) address or network interface card (NIC) identifier of the user computing device.

5. The method of claim 1, wherein the institution system is associated with a financial services institution, and the personalized content comprises financial products or services personalized to the user.

6. A non-transitory computer-readable medium comprising computer-readable instructions for providing personalized content to a user of a website via a user computing device, said computer-readable instructions comprising instructions that:
    identify an identity of the user based on a cookie stored on the user computing device, cookie information stored on an institution system associated with the website, and additional information associated with the user computing device stored on the institution system;
    determine a particular confidence level associated with the identification of the identity of the user from a range of confidence levels representing a strength of an internet protocol (IP) address match of the user computing device, wherein the range includes more than two confidence levels;
    generate a particular degree of personalized content personalized to the user, including personalized content the user is permitted to select, wherein the personalized content is based on the particular confidence level associated with the identification of the identity of the user; and
    deliver the personalized content to the user computing device.

7. The non-transitory computer-readable medium of claim 6, wherein the personalized content is based on the additional information associated with the user computing device stored on the institution system.

8. The non-transitory computer-readable medium of claim 6, further comprising instructions that:
    log the user into the website during a session and authenticate the user prior to storing the cookie directed to the website on the user computing device; and
    end the session and then providing access to the website to the user.

9. The non-transitory computer-readable medium of claim 6, wherein the cookie information comprises information pertaining to the cookie and information pertaining to the user, and the additional information comprises an internet protocol (IP) address or network interface card (NIC) identifier of the user computing device.

10. The non-transitory computer-readable medium of claim 6, wherein the institution system is associated with a financial services institution, and the personalized content comprises financial products or services personalized to the user.

11. A system for providing personalized content to a user of a website via a user computing device, comprising:
    at least one subsystem that identifies an identity of the user based on a cookie stored on the user computing device, cookie information stored on an institution system associated with the website, and additional information associated with the user computing device stored on the institution system;
    at least one subsystem that determines a particular confidence level associated with the identification of the identity of the user from a range of confidence levels representing a strength of an internet protocol (IP) address match of the user computing device, wherein the range includes more than two confidence levels;

at least one subsystem that generates a particular degree of personalized content personalized to the user, including personalized content the user is permitted to select, wherein the personalized content is based on the particular confidence level associated with the identification of the identity of the user; and at least one subsystem that delivers the personalized content to the user computing device.

12. The system of claim 11, wherein the personalized content is based on the additional information associated with the user computing device stored on the institution system.

13. The system of claim 11, further comprising:

at least one subsystem that logs the user into the website during a session and authenticates the user prior to storing the cookie directed to the website on the user computing device; and at least one subsystem that ends the session and then providing access to the website to the user.

14. The system of claim 11, wherein the cookie information comprises information pertaining to the cookie and information pertaining to the user, and the additional information comprises an internet protocol (IP) address or network interface card (NIC) identifier of the user computing device.

15. The system of claim 11, wherein the institution system is associated with a financial services institution, and the personalized content comprises financial products or services personalized to the user.

* * * * *